US008918575B2

(12) United States Patent
Markey et al.

(10) Patent No.: US 8,918,575 B2
(45) Date of Patent: Dec. 23, 2014

(54) METHOD AND SYSTEM FOR SECURELY PROGRAMMING OTP MEMORY

(75) Inventors: John Markey, San Diego, CA (US); Love Kothari, Sunnyvale, CA (US); Paul Chou, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 939 days.

(21) Appl. No.: 12/559,221

(22) Filed: Sep. 14, 2009

(65) Prior Publication Data

US 2011/0066787 A1   Mar. 17, 2011

(51) Int. Cl.
*G06F 12/00* (2006.01)
*G06F 21/57* (2013.01)

(52) U.S. Cl.
CPC .................................. *G06F 21/572* (2013.01)
USPC .................................. 711/102; 711/E12.001

(58) Field of Classification Search
USPC .......................................... 711/102, E12.001
See application file for complete search history.

(56) References Cited

U.S. PATENT DOCUMENTS

| | | | |
|---|---|---|---|
| 5,757,919 A * | 5/1998 | Herbert et al. ................. | 713/187 |
| 6,629,309 B1 * | 9/2003 | Allen, III ...................... | 716/121 |
| 7,444,682 B2 | 10/2008 | Li et al. | |
| 2002/0112157 A1 * | 8/2002 | Doyle et al. ................... | 713/157 |
| 2003/0035320 A1 * | 2/2003 | Sung et al. ................ | 365/185.17 |
| 2003/0159090 A1 * | 8/2003 | Wray et al. ..................... | 714/38 |
| 2004/0025010 A1 | 2/2004 | Azema et al. | |
| 2005/0132186 A1 | 6/2005 | Khan et al. | |
| 2006/0130149 A1 * | 6/2006 | Xiang ............................. | 726/26 |
| 2007/0157000 A1 | 7/2007 | Qawami et al. | |
| 2007/0277060 A1 * | 11/2007 | Cornwell et al. ............... | 714/54 |
| 2007/0294497 A1 | 12/2007 | Chen | |
| 2008/0148001 A1 * | 6/2008 | Gehrmann et al. ........... | 711/164 |
| 2009/0288160 A1 | 11/2009 | Esliger et al. | |

* cited by examiner

*Primary Examiner* — Larry Mackall
(74) *Attorney, Agent, or Firm* — Brinks Gilson & Lione

(57) ABSTRACT

A semiconductor chip may be operable to receive and copy an OTP programming vector presented by the semiconductor chip programming device into its memory after it boots up from the boot read-only memory (ROM). The OTP programming vector which is a computer program may comprise an encrypted data to be programmed into the one-time programmable (OTP) memory in the semiconductor chip and may be signed with an electronic signature. The semiconductor chip may be operable to authenticate the OTP programming vector in the memory. The authenticated OTP programming vector in the memory may be executed to decrypt the data and program the data in a random data format into the OTP memory and then report the status via one or more general purpose input/output (GPIO) pins on the semiconductor chip.

20 Claims, 4 Drawing Sheets

METHOD AND SYSTEM FOR SECURELY PROGRAMMING OTP MEMORY

CROSS-REFERENCE TO RELATED APPLICATIONS/INCORPORATION BY REFERENCE

[Not applicable]

FIELD OF THE INVENTION

Certain embodiments of the invention relate to semiconductor chips. More specifically, certain embodiments of the invention relate to a method and system for securely programming one-time programmable (OTP) memory.

BACKGROUND OF THE INVENTION

Semiconductor chips are electronic components that exploit the electronic properties of semiconductor materials, principally silicon, germanium and gallium arsenide. Semiconductor chips are manufactured both as single discrete devices and as integrated circuits (ICs), which consist of a number of devices manufactured and interconnected on a single semiconductor substrate.

Semiconductor chips, for example, the processor chips to be used in mobile handsets may have a boot read-only memory (ROM) with boot code integrated into their silicon so such a chip could perform quite sophisticated boot sequence on its own and load boot programs from various sources like NAND flash, SD or MMC card and so on. Also a boot ROM is often able to load boot loader or diagnostic program via serial interfaces like UART, SPI, USB and so on.

Semiconductor chips may be equipped with a one-time programmable (OTP) memory. The OTP memory is a field-programmable logic array (FPLA) that it may not be updated and reused after its initial programming. In other words, the OTP memory may be programmed once and may not be subsequently reprogrammed. The data stored in the OTP memory may be used for various customer specific applications such as, for example, enabling configuring chip usage features, authenticating any secondary boot images (for example, NOR, NAND, USB flashes), authenticating any other codes running on the chip, etc.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for securely programming OTP memory, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for securely programming OTP memory. In various embodiments of the invention, a semiconductor chip may be operable to receive and copy an OTP programming vector into the memory in the semiconductor chip after the semiconductor chip boots up from the boot ROM during the process of programming the OTP memory. The OTP programming vector may be presented by a semiconductor chip programming device. The OTP programming vector, which may be a computer program, may comprise data to be programmed into the OTP memory in the semiconductor chip and an electronic signature. The semiconductor chip may be operable to authenticate the OTP programming vector in the memory in the semiconductor chip. The semiconductor chip may be operable to execute the authenticated OTP programming vector and program the data into the OTP memory in the semiconductor chip. The semiconductor chip may report a status via one or more general purpose input/output (GPIO) pins on the semiconductor chip. In this regard, the electronic signature in the OTP programming vector may be signed by using a private key and the semiconductor chip may authenticate the OTP programming vector using a public key stored in the boot ROM. The semiconductor chip may also be operable to program the data into the OTP memory in a random data format using the random number generator (RNG) in the semiconductor chip. The data in the OTP programming vector to be programmed into the OTP memory may be encrypted, for example, by using a symmetric key. The semiconductor chip may be operable to decrypt the encrypted data, for example, using the symmetric key stored in the boot ROM during the execution of the OTP programming vector, and may add an optional software (SW) error correction code (ECC) for improving the reliability of reading the data from the OTP memory.

Figure 1:
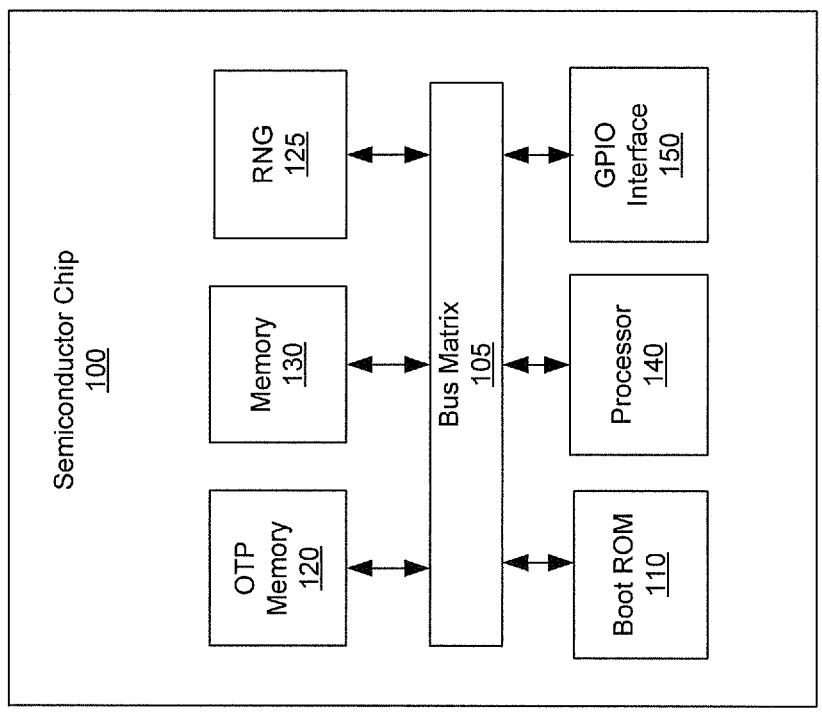
FIG. 1 is a block diagram illustrating an exemplary semiconductor chip, in accordance with an embodiment of the invention.

FIG. 1 is a block diagram illustrating an exemplary semiconductor chip, in accordance with an embodiment of the invention. Referring to FIG. 1, there is shown a semiconductor chip 100. The semiconductor chip 100 may comprise a bus matrix 105, a boot ROM 110, an OTP memory 120, a random number generator (RNG) 125, a memory 130, a processor 140 and a general purpose input/output (GPIO) interface 150.

The bus matrix 105 may comprise suitable logic, circuitry, interfaces and/or code that may be operable to provide communication connections for transferring data among modules in the semiconductor chip 100. The bus matrix 105 may be operable to provide communication connections for the boot ROM 110, the OTP memory 120, the RNG 125, the memory 130, the processor 140 and the GPIO interface 150.

The boot ROM 110 may comprise suitable logic, circuitry, interfaces and/or code that may be operable to perform booting process. The boot ROM 110 may comprise boot code and/or customer data. The boot code may comprise booting instructions and/or other algorithms to be executed during power up or reboot. During the process of programming the OTP memory 120, the boot code may receive and copy the OTP programming vector presented by the semiconductor chip programming device into the memory 130 and execute the OTP programming vector to program data or keys into the OTP memory 120. The boot code may be developed in a secure environment with restricted access and may be thoroughly tested prior to the tape-out stage or the final stage of the chip design cycle. The customer data may comprise, for example, a public key for authenticating the OTP programming vector and/or a symmetric key for decrypting the data or keys to be programmed into the OTP memory 120 during the process of programming the OTP memory 120.

The OTP memory 120 may comprise suitable logic, circuitry, interfaces and/or code that may be operable to store data. The data stored in the OTP memory 120 may be securely programmed once and may not be subsequently reprogrammed. The data stored in the OTP memory may be in a random format generated by using the RNG 125 during the process of programming the OTP memory 120. The data stored in the OTP memory 120 may comprise keys that may be used by the boot code in the boot ROM 110 to authenticate any secondary boot images such as, for example, NOR, NAND, and/or USB flashes. The data stored in the OTP memory 120 may comprise customer specific secrets or keys that may be used to authenticate any other codes which may run on the semiconductor chip 100. If the authentication fails, the semiconductor Chip 100 may reset itself. The data, for example, the customer specific secrets or keys stored in the OTP memory 120 may be read by the boot code at power up and may be hidden afterwards from any further reads until next reset, thus eliminating any chances of leaking the data out.

The RNG 125 may comprise suitable logic, circuitry, interfaces and/or code that may be operable to generate a sequence of numbers or symbols that lack any pattern, i.e., appear random. The RNG 125 may generate the random numbers or symbols using, for example, a pseudo-random algorithm. During the process of programming the OTP memory 120, the RNG 125 may be used to generate a random data, for example, a random key to be stored in the OTP memory 120.

The processor 140 may comprise suitable logic, circuitry, interfaces and/or code that may be operable to communicate with the memory 130 to provide various executable algorithms for various operations and applications such as the operations and/or the applications in a mobile handset.

The memory 130 may comprise suitable logic, circuitry, interfaces and/or code that may be operable to store information such as executable instructions and data that may be utilized by the processor 140 and/or by the boot ROM 110. The memory 130 may be operable to store the OTP programming vector presented by the semiconductor chip programming device for execution by the boot ROM 110 during the process of programming the OTP memory 120.

The GPIO interface 150 may comprise suitable logic, circuitry, interfaces and/or code that may be operable to provide interfaces with external devices and peripherals. These may act as input, to read digital signals from other devices, or output, to control or signal to other devices. The GPIO 150 may be operable to report a status of the OTP programming via one or more GPIO pins of the GPIO interface 150 during the process of programming the OTP memory 120.

In operation, the semiconductor chip 100 may boot up from the boot ROM 110 during the process of programming the OTP memory 120. The boot ROM 110 may receive and copy the OTP programming vector presented by the semiconductor chip programming device into the memory 130 and then authenticate the OTP programming vector using the public key which may be stored in the boot ROM 110. After authentication of the OTP programming vector, the boot ROM 110 may execute the authenticated OTP programming vector to decrypt the data, for example, the customer specific secret or key and program the decrypted data into the OTP memory 120. The boot ROM 110 may report the status of the OTP memory programming via one or more pins of the GPIO interface 150 in the semiconductor chip 100.

Figure 2:
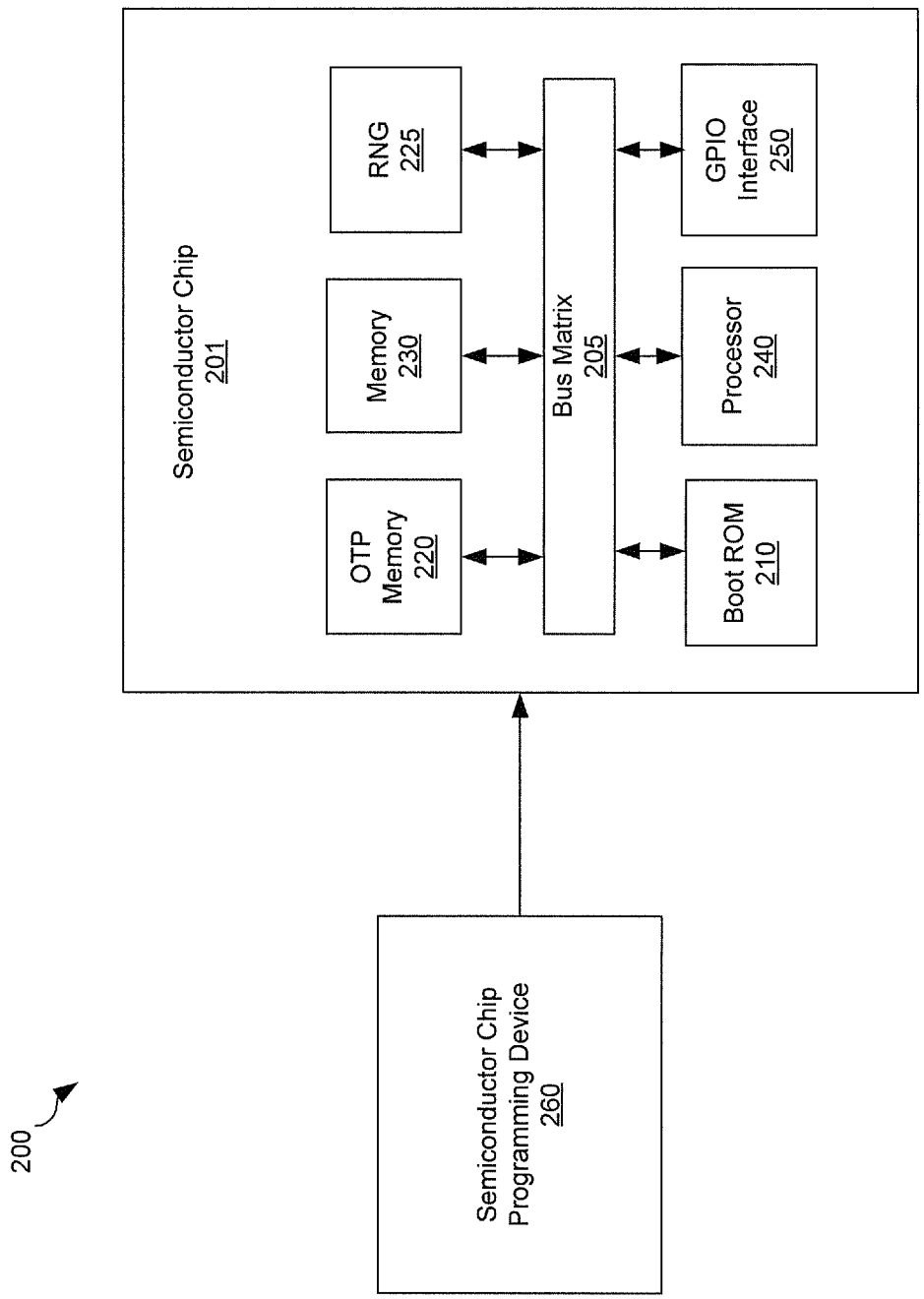
FIG. 2 is a block diagram illustrating an exemplary system that is operable to provide securely programming OTP memory, in accordance with an embodiment of the invention.

FIG. 2 is a block diagram illustrating an exemplary system that is operable to provide securely programming OTP memory, in accordance with an embodiment of the invention. Referring to FIG. 2, there is shown a semiconductor chip programming system 200. The semiconductor chip programming system 200 may comprise a semiconductor chip 201 and a semiconductor chip programming device 260. The semiconductor 201 may comprise a bus matrix 205, a boot ROM 210, an OTP memory 220, a RNG 225, a memory 230, a processor 240 and a GPIO interface 250.

The semiconductor chip programming device 260 may comprise suitable logic, circuitry, interfaces and/or code that may be operable to program data such as, for example, customer specific secrets or keys into the OTP memory 220 in the semiconductor chip 201 during the process of programming the OTP memory 220. An OTP programming vector which may be a computer program handled in a secure environment may be stored in the semiconductor chip programming device 260. The OTP programming vector may be utilized to program the OTP memory 220 and it may comprise the data, for example, the customer specific secrets or keys to be programmed into the OTP memory 220. The data may be kept in the encrypted format so that even if the OTP programming vector is somehow compromised, the data may never be exposed. The OTP programming vector may be securely signed with an electronic signature, for example, using a private key by the chip manufacturer. The semiconductor chip programming device 260, for example, an automatic test equipment (ATE) during the wafer sort testing process may be operable to present the OTP programming vector to the semiconductor chip 201 during the process of programming the OTP memory 220.

The semiconductor chip 201 may be substantially similar to the semiconductor chip 100 in FIG. 1. The bus matrix 205 may be substantially similar to the bus matrix 105 in FIG. 1. The boot ROM 210 may be substantially similar to the boot ROM 110 in FIG. 1. The OTP memory 220 may be substantially similar to the OTP memory 120 in FIG. 1. The RNG 225 may be substantially similar to the RNG 125 in FIG. 1. The memory 230 may be substantially similar to the memory 130 in FIG. 1. The processor 240 may be substantially similar to the process 140 in FIG.1. The GPIO interface 250 may be substantially similar to the GPIO interface 150 in FIG. 1.

In operation, the semiconductor chip programming device 260, for example, an ATE during the wafer sort testing process may present the OTP programming vector to the semiconductor chip 201 during the process of programming the OTP memory 220. The OTP programming vector may comprise the customer specific secret or key to be programmed into the OTP memory 220 in the encrypted format and the OTP programming vector may be securely signed with an electronic signature using a private key by the chip manufacturer.

During the operation of programming the OTP memory 220, the semiconductor chip 201 may boot up from the boot ROM 210. The boot ROM 210 may receive and copy the OTP programming vector presented by the semiconductor chip programming device 260 into the memory 230 and then authenticate it using the public key which may be stored in the boot ROM 210. After authentication of the OTP programming vector, the boot ROM 210 may execute the authenticated OTP programming vector. The boot ROM 210 or the OTP programming vector may first decrypt the customer specific secret or key to be programmed into the OTP memory 220. For the decryption, the OTP programming vector may use, for example, the symmetric key which may also be stored in the boot ROM 210. The OTP programming vector may also optionally add a software (SW) error correction code (ECC) for improving the reliability of reading the customer specific secret or key from the OTP memory 220. After decrypting the customer specific secret or key, the OTP programming vector may program the customer specific secret or key into the OTP memory 220.

In an exemplary embodiment of the invention, the OTP programming vector may program the customer specific secret or key into the OTP memory 220 in a random data or key format using the RNG 225 in the semiconductor chip 201. The OTP programming vector may then report the status of the OTP memory programming via one or more pins of the GPIO interface 250 on the semiconductor chip 201. All of this OTP memory programming process may be done inside the semiconductor chip 201 through the bus matrix 205 and thus any physical tampering at an interface of the semiconductor chip 201 will not reveal the customer specific secret or key comprised in the OTP programming vector or allow a different customer specific secret or key to be programmed into the OTP memory 220.

Figure 3:
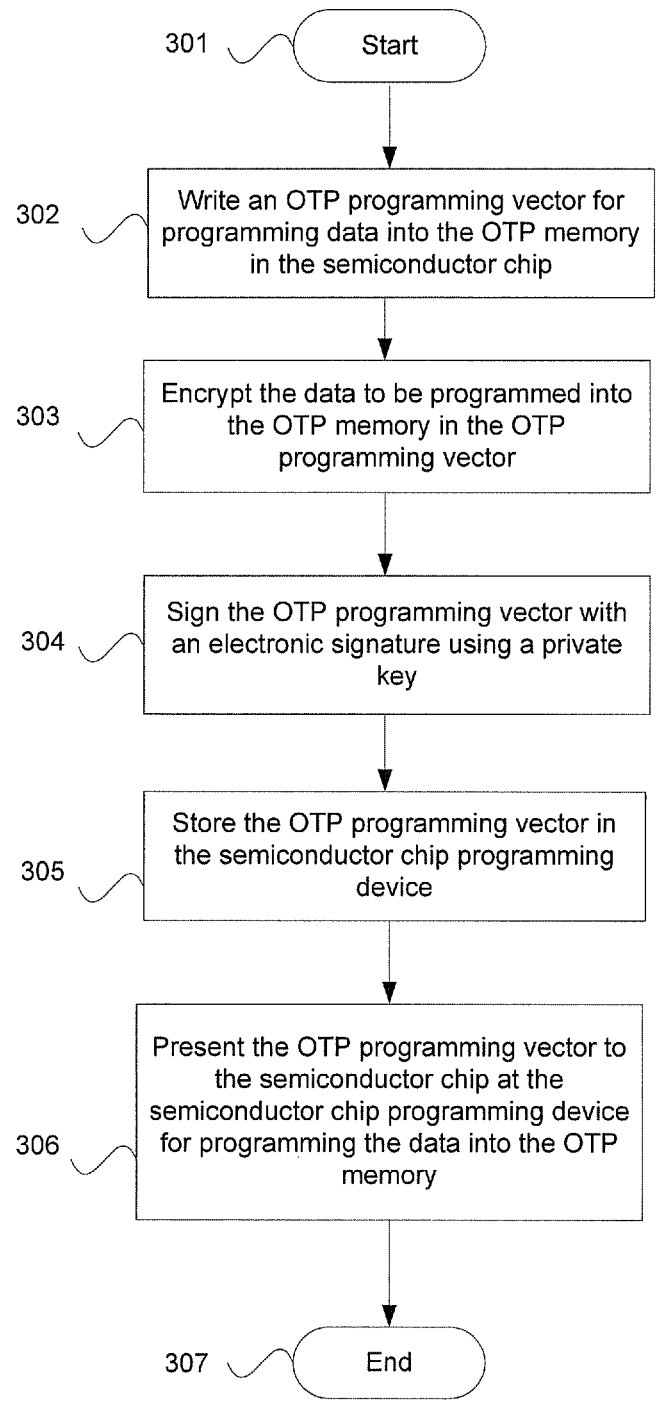
FIG. 3 is a flow chart illustrating exemplary steps for presenting OTP programming vector to the semiconductor chip for programming OTP memory, in accordance with an embodiment of the invention.

FIG. 3 is a flow chart illustrating exemplary steps for presenting OTP programming vector to the semiconductor chip for programming OTP memory, in accordance with an embodiment of the invention. Referring to FIG. 3, in step 302 after the start step 301, an OTP programming vector may be written for programming data into the OTP memory 220 in the semiconductor chip 201. In step 303, the data to be programmed into the OTP memory may be encrypted in the OTP programming vector. In step 304, the OTP programming vector may be signed with an electronic signature using a private key by the chip manufacturer. In step 305, the OTP programming vector may be stored in the semiconductor chip programming device 260. In step 306, the semiconductor chip programming device 260 may be operable to present the OTP programming vector to the semiconductor chip 201 for programming the data into the OTP memory 220. The exemplary steps may proceed to the end step 307.

Figure 4:
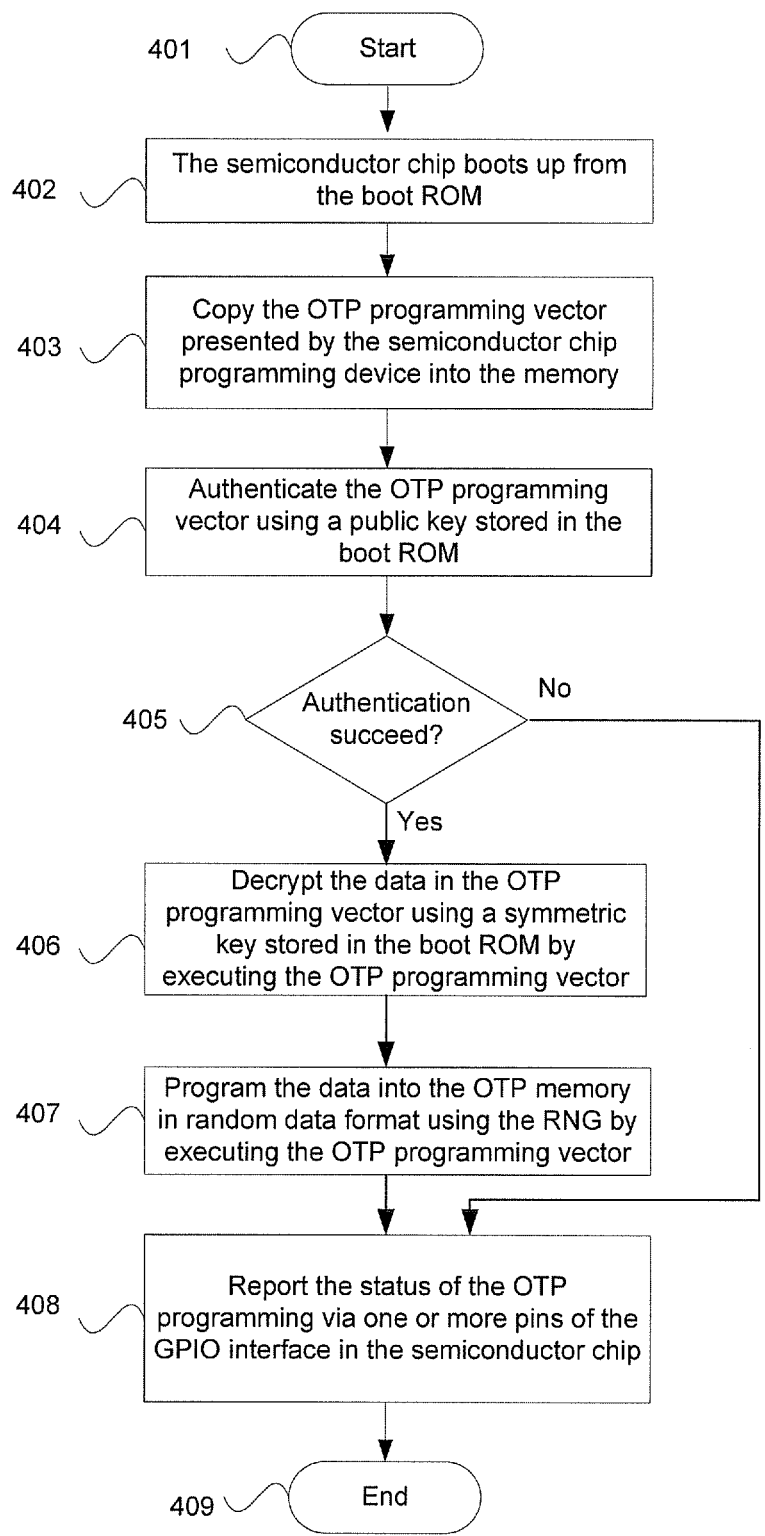
FIG. 4 is a flow chart illustrating exemplary steps for securely programming OTP memory by executing the OTP programming vector, in accordance with an embodiment of the invention.

FIG. 4 is a flow chart illustrating exemplary steps for securely programming OTP memory by executing the OTP programming vector, in accordance with an embodiment of the invention. Referring to FIG. 4, in step 402 after the start step 401, the semiconductor chip 201 may boot up from the boot ROM 210. In step 403, the semiconductor chip 201 may be operable to copy the OTP programming vector presented by the semiconductor chip programming device 260 into the memory 230 in the semiconductor chip 201. In step 404, the semiconductor chip 201 may be operable to authenticate the OTP programming vector using a public key stored in the boot ROM 210. In step 405, the authentication result is checked. In instances when the authentication succeeds, the exemplary steps may proceed to step 406. In step 406, the semiconductor chip 201 may be operable to decrypt the data in the OTP programming vector using a symmetric key stored in the boot ROM 210 by executing the OTP programming vector. In step 407, the semiconductor chip 201 may be operable to program the data into the OTP memory 220 in random data format using the RNG 225 by executing the OTP programming vector. In step 408, the semiconductor chip 201 may be operable to report the status of the OTP programming via one or more pins of the GPIO interface 250 in the semiconductor chip 201. The exemplary steps may proceed to the end step 409. In step 405, in instances when the authentication fails, the exemplary steps may proceed to step 408.

In various embodiments of the invention, a semiconductor chip 201 may be operable to receive and copy an OTP programming vector presented by the semiconductor chip programming device 260 into the memory 230 in the semiconductor chip 201 after the semiconductor chip 201 boots up from the boot ROM 210 during the process of programming the OTP memory 220. The OTP programming vector which may be a computer program may comprise data to be programmed into the OTP memory 220 in the semiconductor chip 201 and an electronic signature. The semiconductor chip 201 may be operable to authenticate the OTP programming vector in the memory 230 in the semiconductor chip 201. The semiconductor chip 201 may be operable to execute the authenticated OTP programming vector and program the data into the OTP memory 220 in the semiconductor chip 201. The semiconductor chip 201 may report the status of the OTP programming via one or more pins of the general purpose input/output (GPIO) interface 250 in the semiconductor chip. In this regard, the electronic signature in the OTP programming vector may be signed by using a private key and the semiconductor chip 201 may authenticate the OTP programming vector using a public key stored in the boot ROM 210. The semiconductor chip 201 may also be operable to program the data into the OTP memory 220 in a random data format using the random number generator (RNG) 225 in the semiconductor chip 201. The data in the OTP programming vector to be programmed into the OTP memory 220 may be encrypted, for example, by using a symmetric key. The semiconductor chip 201 may be operable to decrypt the encrypted data, for example, using the symmetric key stored in the boot ROM 210 during the execution of the OTP programming vector, and may add an optional software (SW) error correction code (ECC) for improving the reliability of reading the data from the OTP memory 220.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for securely programming OTP memory.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   receiving, at a semiconductor chip after said semiconductor chip boots up from a boot read-only memory (ROM), a computer program including a vector that includes encrypted data; and
   programming, according to said computer program, said encrypted data into a one-time programmable (OTP) memory of said semiconductor chip.

2. The method according to claim 1, wherein said encrypted data comprises an electronic signature that is signed using a private key.

3. The method according to claim 1, comprising authenticating said computer program using a public key.

4. The method according to claim 1, comprising programming said encrypted data into said OTP memory in a random data format using a random number generator (RNG) of said semiconductor chip.

5. The method according to claim 1, wherein said encrypted data is encrypted by using a symmetric key.

6. The method according to claim 5, comprising decrypting said encrypted data during execution of said computer program using said symmetric key.

7. The method according to claim 1, comprising decrypting said encrypted data during execution of said computer program.

8. The method according to claim 1, comprising adding a software (SW) error correction code (ECC) for improving a reliability of reading said encrypted data from said OTP memory.

9. The method according to claim 1, comprising adding a SW ECC for improving a reliability of reading said encrypted data from said OTP memory.

10. A system, comprising:
    a processor of a semiconductor chip, said processor configured to:
    receive a computer program, said computer program including a vector that includes encrypted data, after said semiconductor chip boots up from a boot read-only memory (ROM); and
    program said encrypted data, according to said computer program, into a field-programmable logic array of a one-time programmable (OTP) memory of said semiconductor chip.

11. The system according to claim 10, wherein said encrypted data comprises an electronic signature that is signed using a private key.

12. The system according to claim 10, wherein said processor is configured to authenticate said computer program using a public key.

13. The system according to claim 10, wherein said processor is configured to program said encrypted data into said OTP memory in a random data format using a random number generator (RNG).

14. The system according to claim 10, wherein said encrypted data is encrypted by using a symmetric key.

15. The system according to claim 14, wherein said processor is configured to decrypt said encrypted data during execution of said computer program using said symmetric key, and said processor is configured to add a SW ECC for improving a reliability of reading said encrypted data from said OTP memory.

16. The system according to claim 10, wherein said processor is configured to decrypt said encrypted data during execution of said computer program.

17. The system according to claim 10, wherein said processor is configured to add a software (SW) error correction code (ECC) for improving a reliability of reading said encrypted data from said OTP memory.

18. A method, comprising:
    receiving a one-time programmable (OTP) programming vector at a semiconductor chip after said semiconductor chip boots up from a boot read-only memory (ROM), wherein said OTP programming vector comprises encrypted data and a computer program; and
    programming, according to said computer program, said encrypted data into a one-time programmable (OTP) memory in said semiconductor chip.

19. The method of claim 18, wherein said boot ROM is a first memory, wherein said OTP memory is a second memory, wherein said method comprises copying said OTP programming vector into a third memory after said semiconductor chip boots up from said boot ROM during said programming, and wherein said third memory is a part of said semiconductor chip.

20. The method of claim 18, wherein said programming occurs inside said semiconductor chip through interconnect of said semiconductor chip.

* * * * *